(No Model.)
F. P. TERRY.
WHEEL.
No. 592,027. Patented Oct. 19, 1897.
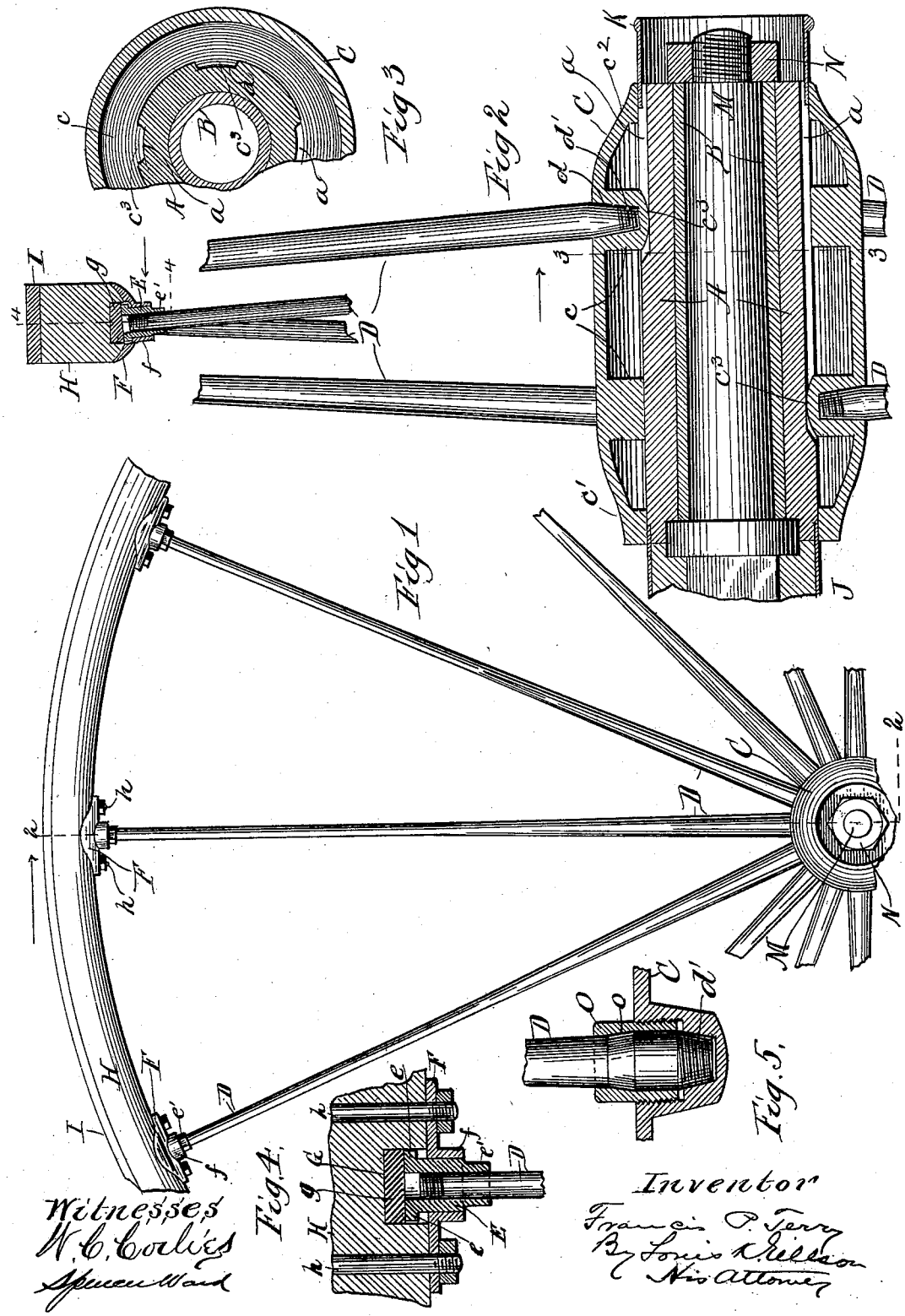
Witnesses
W. C. Corlies
Spencer Ward
Inventor
Francis P. Terry
By Louis W. Gibson
His Attorney

UNITED STATES PATENT OFFICE.

FRANCIS P. TERRY, OF CHICAGO, ILLINOIS.

WHEEL.

SPECIFICATION forming part of Letters Patent No. 592,027, dated October 19, 1897.

Application filed February 10, 1893. Renewed July 27, 1895. Serial No. 557,387. (No model.)

*To all whom it may concern:*

Be it known that I, FRANCIS P. TERRY, a citizen of the United States, residing at Chicago, in the county of Cook and State of Illinois, have invented certain new and useful Improvements in Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of wheels which are known as "suspension-wheels," the spokes being under tension, so that the load is supported from above instead of bearing downwardly upon the lower spokes, as in the case of an ordinary wooden wheel.

The object of the invention is to secure a light, firm, and elastic wheel which shall be both extremely simple and very strong; and it consists in the various parts and arrangement of parts, as hereinafter specified.

In the accompanying drawings, Figure 1 is a side elevation of a portion of my improved wheel. Fig. 2 is a transverse section on the line 2 2 of Fig. 1. Fig. 3 is a transverse section on the line 3 3 of Fig. 2. Fig. 4 is a transverse section on the line 4 4 of Fig. 2, and Fig. 5 is a detail showing one form of securing the spoke to the hub.

The wheel consists of the hub, comprising a body portion A, of wood, which is of uniform external diameter, a journal-box B, of ordinary construction, and an outer metallic shell C; the spokes D D, set in the hub in two series, the spokes of one series alternating with those of the other; and of the felly H, within which the ends of the spokes are secured in the manner hereinafter described.

I show at M the axle-skein; at N, the nut for holding the wheel in place; at J, a sandband; and at K, the ordinary outwardly-projecting flange for protecting the skein.

The length of the metallic shell C of the hub is as great as that of the wooden body portion A. The diameter of its ends $c'$ $c^2$ is such that they fit tightly upon the body A, and its intermediate portion is arched, so as to leave a space or chamber about the wooden part. Annular inwardly-projecting flanges or ribs $c$ $c$ extend from this shell, so as to bear against the part A, and are each located approximately one-third of the length of the hub from one of its ends. The flanges $c$ are provided with inwardly-projecting bosses $c^3$, of any desired number, and the outer surface of the part A is longitudinally grooved, as shown at $a$, to receive these bosses, thus locking the two parts of the hub together.

The shell C is socketed to receive the inner ends or bases of the spokes, the flanges $c$ $c$ being so located that the sockets enter them. The sockets and the spoke ends are correspondingly screw-threaded. The most severe lateral strain upon the spoke is at its juncture with the hub. Inasmuch as the cutting of a screw-thread upon the spoke tends to weaken it, I cut the thread only in the inner portion of the socket, as shown at $d'$, and for a corresponding distance upon the end of the spoke, so that a considerable portion of the spoke within the socket is not screw-threaded, and the parts are so adjusted that this smooth portion of the spoke fits tightly within the socket. In order to secure a tight fit in this respect, I prefer to form the socket and spoke end upon a taper, as indicated at $d$, so that as the spoke is screwed into place it is drawn down snugly against the walls of the socket. This taper may extend to the end and bottom of spoke and socket, as shown, or the screw-threaded portion of each may be of uniform diameter. The spoke may be more firmly supported by countersinking the outer portion of the socket to receive a collar O, fitted upon the spoke, the latter being formed with a tapering shoulder, as shown at $o$, against which an inwardly-projecting flange of the collar of similar conformation will bear, the collar and the counterbore of the socket being correspondingly screw-threaded and the outer end of the collar being polysided for the engagement of a wrench, so that the turning of the collar to its seat will draw it down firmly upon the enlarged end of the spoke. When this collar is used, the tapering form of spoke end and socket becomes unnecessary.

The outer end of the spoke is screw-threaded, and a draw-nut E is secured upon it. The length of the spoke is such that it reaches approximately to the inner edge of the felly H, which is recessed, as shown at G, for the purpose of receiving the end of the draw-nut E. The inner end of the draw-nut is provided with an annular flange *e*. A clip F covers the recess G, being secured to the wheel-rim by bolts *h*, passing through the felly and the tire I. This clip is apertured so that the body portion of the draw-nut E fits snugly within the aperture and an annular flange *f* extends outwardly from this aperture, so as to afford a considerable bearing-surface for the walls of the draw-nut. The draw-nut extends down upon the spoke beyond the flange *f*, and this exposed portion *e'* is polysided, so that a wrench may be used for the purpose of securing the desired tension of the spoke by drawing the flange *e* against the clip. The recess G is of such depth that the draw-nut E does not extend to its bottom, so that any concussion upon the tire will not be communicated to the spoke, but the flexing of the felly will cause the flange *f* to slide upon the surface of the draw-nut E. For the purpose of preventing an accumulation of mud in the recess G, I prefer to fill the space beyond the nut with a rubber cushion *g*.

The greatest strain upon the spokes being at their juncture with the hub, it is desirable to make them strongest at that point. This weakness has heretofore been provided against by the use of a spoke tapering from its inner to its outer end for the purpose of securing a gradual flexure through its length. It is found in practice that the most vulnerable portion of a spoke after the one heretofore mentioned is near the felly. In order to secure adequate strength both at the hub and near the felly, I prefer to make the spoke of uniform size from its outer end through a considerable portion, approximately one-half of its length, and then increase its size by gradual taper from that point to the hub.

A wheel constructed as thus described has in its hub the benefit of the elasticity of the wooden body A, with the strength and rigidity of a metallic hub as secured by the shell C, which is of a single piece. The shell being constructed as shown, has the strength of an arch, while the four points of contact with the wooden body—that is, at each end and at each of the ribs *c*—so greatly distribute the pressure that all danger of injury to the wooden body is obviated. The method of securing the spokes to the hub as herein described insures a perfectly secure and permanent joint. The peculiar form of spoke described provides for a distribution of the strain without weakening the spoke at its most vulnerable points. The method of securing the spokes to the felly admits of the use of the form of attachment to the hub as described by providing means for securing the proper tension of the spoke. The wheel is peculiarly elastic from the fact that its rim is permitted to yield upon concussion, while the distortion of the rim from the circular form not only fails to communicate pressure to the spokes adjacent to the point of concussion, but increases the tension upon all of the other spokes. In use the concussion is at the point of contact with the ground and in the form of wheel herein described that is the point at which there is the least strain upon the rim.

It is obvious that the spokes may be solid or hollow and either round or oval in cross-section, as may be desired.

I claim as my invention—

1. In a tension-wheel adapted to support its load by suspension, the combination with spokes screwed into the hub in two series upon opposite sides of the plane of the rim, of a hub having a wooden core, and a metallic shell in arch form in longitudinal section and having two annular internal ribs adapted to bear upon the core and to receive the spoke-sockets, substantially as described.

2. In a wheel the combination with a hub having a metallic shell with countersunk and screw-threaded spoke-sockets, of metal spokes having their ends screw-threaded to fit the sockets and tapering away from the screw-threaded portion, and collars having their outer surfaces screw-threaded at one end to engage the countersunk portion of the sockets and polysided at the other end to engage a wrench, and being apertured to fit tightly upon the enlarged end of the spoke, substantially as described and for the purpose specified.

3. The combination with the rim provided with sockets in its inner side, and the spokes, of the draw-nuts secured upon the outer ends of said spokes and adjustable thereon into said sockets, the clips secured to the socketed portions of the rim and formed with tubular projections receiving the upper portions of said draw-nuts and movable thereon, and means in said sockets, consisting of yieldable cushions interposed between the inner ends of the draw-nuts and the inner walls of the sockets, for preventing an accumulation of mud therein, substantially as shown and described.

In testimony whereof I affix my signature in presence of two witnesses.

FRANCIS P. TERRY.

Witnesses:
MAY H. L. WING,
L. K. GILLSON.